US008413139B2

(12) United States Patent
Shukla et al.

(10) Patent No.: US 8,413,139 B2
(45) Date of Patent: Apr. 2, 2013

(54) PROGRAMMING MODEL FOR APPLICATION AND DATA ACCESS AND SYNCHRONIZATION WITHIN VIRTUAL ENVIRONMENTS

(75) Inventors: Dharma Shukla, Sammamish, WA (US); Abhay Parasnis, Sammamish, WA (US); Raymond Enders, Seattle, WA (US); Arash Ghanaie-Sichanie, Bothell, WA (US); Israel Hilerio, Kenmore, WA (US); Farookh Mohammed, Woodinville, WA (US); Aditya Bhandarkar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 894 days.

(21) Appl. No.: 12/402,351

(22) Filed: Mar. 11, 2009

(65) Prior Publication Data

US 2010/0235830 A1      Sep. 16, 2010

(51) Int. Cl.
G06F 9/455       (2006.01)
G06F 7/04        (2006.01)
(52) U.S. Cl. .............................. 718/1; 726/26
(58) Field of Classification Search ........................ None
See application file for complete search history.

(56) References Cited

U.S. PATENT DOCUMENTS

| | | | |
|---|---|---|---|
| 6,151,599 A | 11/2000 | Shrader et al. | |
| 6,233,606 B1 | 5/2001 | Dujari | |
| 6,546,554 B1 | 4/2003 | Schmidt et al. | |
| 6,594,682 B2 | 7/2003 | Peterson et al. | |
| 6,725,262 B1 | 4/2004 | Choquier et al. | |
| 7,080,051 B1 | 7/2006 | Crawford | |
| 7,219,304 B1 | 5/2007 | Kraenzel et al. | |
| 7,263,712 B2 | 8/2007 | Spencer | |
| 7,272,782 B2 | 9/2007 | Sneh | |
| 7,594,003 B2 | 9/2009 | Davidson et al. | |
| 7,870,596 B2 * | 1/2011 | Schackow et al. | 726/1 |
| 8,082,541 B2 | 12/2011 | Pramanick et al. | |
| 2001/0003828 A1 | 6/2001 | Peterson et al. | |

(Continued)

FOREIGN PATENT DOCUMENTS

CN        101309291 A       11/2008
WO        2007083299 A2      7/2007

OTHER PUBLICATIONS

U.S. Appl. No. 12/402,366, filed Mar. 11, 2009, Shukla et al.
U.S. Appl. No. 12/402,375, filed Mar. 11, 2009, Shukla et al.

(Continued)

*Primary Examiner* — Qing Wu
(74) *Attorney, Agent, or Firm* — Microsoft Corporation

(57) ABSTRACT

Applications executing on computer systems may execute in a virtual environment, such as a web application executing in a web browser. An application may access the actual computing environment (such as the filesystem), but this accessing may be complicated; e.g., the computing environment may be deployed across many computers and devices, and may be synchronized for offline access via a local cache. A computing environment component may service the complex computing environment (e.g., by managing the cache and retrieving remotely stored data objects) and expose it as a well-organized set of data objects. A virtual environment interface (e.g., a web browser plug-in) may allow applications hosted in the virtual environment to access the computing environment through the computing environment component. Programmatic interfaces may also be implemented to permit such accessing via familiar programming languages and techniques, such as JavaScript libraries exposed to web applications in the web browser.

20 Claims, 7 Drawing Sheets

U.S. PATENT DOCUMENTS

| | | |
|---|---|---|
| 2002/0103822 A1 | 8/2002 | Miller |
| 2002/0184624 A1 | 12/2002 | Spencer |
| 2004/0015504 A1 | 1/2004 | Rafuil et al. |
| 2004/0034853 A1 | 2/2004 | Gibbons et al. |
| 2005/0188051 A1 | 8/2005 | Sneh |
| 2005/0240558 A1 | 10/2005 | Gil et al. |
| 2006/0031264 A1 | 2/2006 | Bosworth et al. |
| 2006/0155776 A1 | 7/2006 | Aust |
| 2007/0033155 A1 | 2/2007 | Landsman |
| 2007/0033569 A1 | 2/2007 | Davidson et al. |
| 2007/0033588 A1 | 2/2007 | Landsman |
| 2007/0078950 A1 | 4/2007 | Hopkins et al. |
| 2007/0180125 A1 | 8/2007 | Knowles et al. |
| 2008/0072053 A1 | 3/2008 | Halim |
| 2008/0098093 A1 | 4/2008 | Simon et al. |
| 2008/0104195 A1 | 5/2008 | Hawkins et al. |
| 2008/0147671 A1 | 6/2008 | Simon et al. |
| 2008/0189767 A1* | 8/2008 | Kothari et al. .............. 726/4 |
| 2008/0222628 A1 | 9/2008 | Batra et al. |
| 2009/0254589 A1 | 10/2009 | Nair et al. |
| 2009/0276771 A1 | 11/2009 | Nickolov et al. |
| 2010/0125477 A1 | 5/2010 | Mousseau et al. |

OTHER PUBLICATIONS

"How They Work: Three Approaches to authorization Management", www.computerworld.com/computerworld/records/images/pdf/37techtools.pdf.

"How to Access the Sharing Data Offline?", pp. 1-6, http://www.computerfreetips.com/networking_tips/access_sharing_data_offline.html.

"HTML5 Offline Apps", 2008, pp. 1-4, http://www.3.org/TR/offline-webapps/.

"HTML5 Offline Cache", Jan. 16, 2009, pp. 1-19, http://www.whatwg.org/specs/web-apps/current-work/multipage/offline.html.

"HTML5 Offline Cache", Jan. 24, 2009, pp. 1-19, http://www.whatwg.org/specs/web-apps/current-work/multipage/offline.html.

"IBM Lotus Expeditor 6.1 Programming Model Overview" 2006, pp. 1-12, http://publib.boulder.ibm.com/infocenter/ieduasst/lotv1r0/topic/com.ibm.iea.expeditor_v6/exped itor/6.1/ProgrammingModel/xpdv6.1_programming_model.pdf.

"IE8 Offline Storage", p. 1, http://msdn.microsoft.com/en-us/library/cc197062(VS.85).aspx.

"IE8 Offline Storage", 2009 Microsoft Corporation, pp. 1-5, http://msdn.microsoft.com/en-us/library/cc197062(VS.85).aspx.

Introducing Microsoft Sync Framework: Sync Services for File Systems, Microsoft Corporation, Nov. 2007, pp. 1-5, http://msdn.microsoft.com/en-us/sync/bb887623.aspx.

"Introducing Microsoft Sync Framework: Sync Services for File Systems", 2009 Microsoft Corporation, pp. 1-9, http://msdn.microsoft.com/en-us/sync/bb887623.aspx.

Kesteren, et al., "HTML5 Offline Apps", May 2008, pp. 1-4, http://www.w3.org/TR/offline-webapps/.

Russer, Michael, "How to Turn Your Web Browser into a Powerful Offline Sales Presentation Tool", Jan. 16, 2009, pp. 1-3, http://realtytimes.com/rtpages/20020418_offlineprez.htm.

"View and Save Videos Stored in Browser Cache", pp. 1-2, http://www.thefreewindows.com/?p=334.

"Web Application Manager", Distributed Systems Solutions, Inc., 1997-2000, pp. 1-11, http://www.dssolutions.com/documents/wam_whitepaper.pdf.

".NET 4.0: Enabling WCF Service for Discovery", studeni 2008—Posts—DamirDobric, pp. 1-11, http://live.mscommunity.net/blogs/damirdobric/archive/2008/11.aspx.

Thorpe, Danny, "Client-Side Live Operating Environment: What's it for?", Nov. 18, 2008, pp. 1-8, http://dannythorpe.com/2008/11/18/client-side-live-operating-environment-whats-it-for/.

Borck, James, "Product Review: Adobe Breathes Fresh AIR into RIA", Apr. 21, 2008, pp. 1-4, http://www.infoworld.com/article/08/04/21/17TC-adobe-air_1.html.

Mikhalenko, Peter, "Introducing JavaFX: Sun's New Family of Java-based Products", Feb. 26, 2008, pp. 1-7, http://www.builderau.com.au/program/java/soa/Introducing-JavaFX-Sun-s-new-family-of-Java-based-products/0,339024620,339286272,00.htm?feed=pt_air.

"Authentication in Client Applications", 2009 Microsoft Corporation, p. 1, http://msdn.microsoft.com/en-us/library/dd199485.aspx.

O'Hear, Steve, "Microsofts Mesh Wants to be your Digital-Hub" Apr. 23, 2008, pp. 1-6, http://www.last100.com/2008/04/23/microsofts-mesh-wants-to-be-your-digital-hub/.

Bohon, Cory, "Live Mesh now available for Mac OS X", Nov. 26, 2008, pp. 1-17, http://www.tuaw.com/2008/11/26/live-mesh-now-available-for-mac-os-x/.

Fernandes, Dan, "Ori Amiga: Programming the Mesh", Apr. 24, 2008, pp. 1-3, http://channel9.msdn.com/posts/Dan/Ori-Amiga-Programming-the-Mesh/.

Non-Final Office Action cited in related U.S. Appl. No. 12/402,366 dated Jul. 8, 2011, 27 pgs.

Reply to Non-Final Office Action cited in related U.S. Appl. No. 12/402,366 dated Oct. 11, 2011, 16 pgs.

Final Office Action cited in related U.S. Appl. No. 12/402,366 dated Feb. 3, 2012, 25 pgs.

Reply to Final Office Action cited in related U.S. Appl. No. 12/402,366 dated Mar. 30, 2012, 21 pgs.

Non-Final Office Action cited in related U.S. Appl. No. 12/402,375 dated May 10, 2012, 49 pgs.

Reply to Non-Final Office Action cited in related U.S. Appl. No. 12/402,375 dated Aug. 10, 2012, 22 pgs.

Final Office Action cited in related U.S. Appl. No. 12/402,375 dated Oct. 24, 2012, 50 pgs.

International Search Report cited in PCT Application No. PCT/US2010/024669 dated Sep. 29, 2010, 3 pgs.

International Preliminary Report on Patentability cited in PCT Application No. PCT/US2010/024669 dated Sep. 13, 2011, 5 pgs.

Reply Final Office Action cited in U.S. Appl. No. 12/402,375 dated Jan. 24, 2013, 24 pgs.

Chinese Office Action cited in Chinese Application No. 201080011292.9 dated Nov. 29, 2012, 4 pgs.

* cited by examiner

PROGRAMMING MODEL FOR APPLICATION AND DATA ACCESS AND SYNCHRONIZATION WITHIN VIRTUAL ENVIRONMENTS

BACKGROUND

Contemporary computing systems involve the execution of applications within an operating system. The operating system involves a wide variety of data objects, such as files stored in a file system, databases stored in a database management system, application and system configuration information stored in a system registry, and a set of user accounts. Applications are often modeled with an architecture involving an accessing of various types of data objects, some logic applicable to the data objects as a set of operations, and a rendering of the operations and data objects in the form of a user interface.

The application may also be executed in a virtual environment that offers the application a limited set of computing resources (such as storage space, processing, and devices) with which the application may operate. In some cases, the virtual environment may represent a standardized platform against which the application may execute, thereby promoting the consistent execution of the application on a wide variety of machines, and the virtual environment may translate operations against the virtual environment to operations that may be performed by the computer (e.g., the platform may permit the application to store the data object in an emulated data store, but the virtual environment may instead store the data object as a file in the filesystem.) This virtualization may also promote the security of the application, both by restricting the manner in which the application may access the computing environment (e.g., in case the application is not fully trusted and may contain faulty or malicious instructions) and by reducing interference in the application from other processes executing both with and outside the virtual environment.

One common virtual environment is a web browser. Web applications are often developed for execution in a web browser, and may be executed by delivering the application resources comprising the application to the computer for execution within the web browser.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The logistics of executing applications in a contemporary computing environment may be complicated in many aspects. As a first example, the application may access data objects comprising the user's computing environment that comprise a wide variety of types, and that are accessed through a broad set of data object systems (such as a filesystem, a database system, a registry, and a user account management system), each configured to store a particular set of data objects and to provide access through a particular protocol. Moreover, a data object used by the application may be stored in many locations within the computer, and even on a remote computer that shares the user's computing environment. For example, a data object used by the application may be represented in the computing environment that is accessible to the local computer, but may not be locally stored, and may instead be stored on a remote computer. Accessing the data object may therefore involve identifying the remote computer where the data object is stored, requesting the data object from the remote computer, storing a received instance of the data object, and synchronizing any alterations of the data object with the remote computer.

The computer may be configured to support the execution of the application In view of this and other complexities. For example, a computing environment component may be devised to handle the accessing of data objects in the broad spectrum of the computing environment. As a first example, the virtual environment may permit the application to access the computing environment; e.g., a web browser may permit a web application executing therein to access the data objects of the user's computing environment, but in a restricted manner that reduced unauthorized accesses, such as tampering with system files that are not necessarily part of the computing environment. As a second example, the computer may be configured to promote the interfacing of the application with many types of data object systems, such as those stored on remote computers. For example, the computer may automatically synchronize the computing environment (including data objects comprising or used by the application) with a representation of the computing environment stored by of a remote computer, and may handle the retrieval of a data object in the computing environment that is accessed by the application but that is not yet locally available.

These and other advantages may be achieved by configuring the virtual environment to support the accessing of data objects comprising the computing environment by the application. One such technique involves a computing environment component that handles various accesses to the myriad objects comprising the computing environment (e.g., interfacing with various data object systems, and handling the exchange of data objects with remote computers), and a virtual environment interface that permits applications executing in the virtual environment to interact with the computing environment through the computing environment component. For example, a web browser plug-in may be devised for a web browser that allows web applications to access the computing environment through the computing environment component; e.g., for operations to be executed against the computing environment on behalf of the application (such as reading a file from the filesystem), the plug-in may accept such operations within the web browser and may deliver them to the computing environment component executing outside of the browser.

The computing environment may be configured to provide an array of services to the data objects contained therein. For example, the data objects stored on a computer may be automatically synchronized with corresponding data objects stored on another computer, including a computing environment host that hosts an authoritative version of the computing environment. Even if the application executes in a virtual environment (such as a web browser), the application may be permitted to store its application resources in the computing environment, and may partake of the services offered thereby. For example, a set of web applications that store respective application resources in the computing environment may be automatically synchronized across a set of computers, thereby promoting a consistent computing experience of the applications on all such computers.

In addition, the computing environment component may expose certain aspects of the computing environment and the services provided thereto in a programmatic interface. Applications may either participate in the complexities of the computing environment (e.g., the synchronization of a locally cached data object with a remote host), or may rely on the computing environment to handle such complexities. Moreover, the programmatic interface may be devised in a manner that is familiar to developers and accessible by applications without significant reconfiguring; e.g., a web browser plug-in may provide a JavaScript programmatic interface to the computing environment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
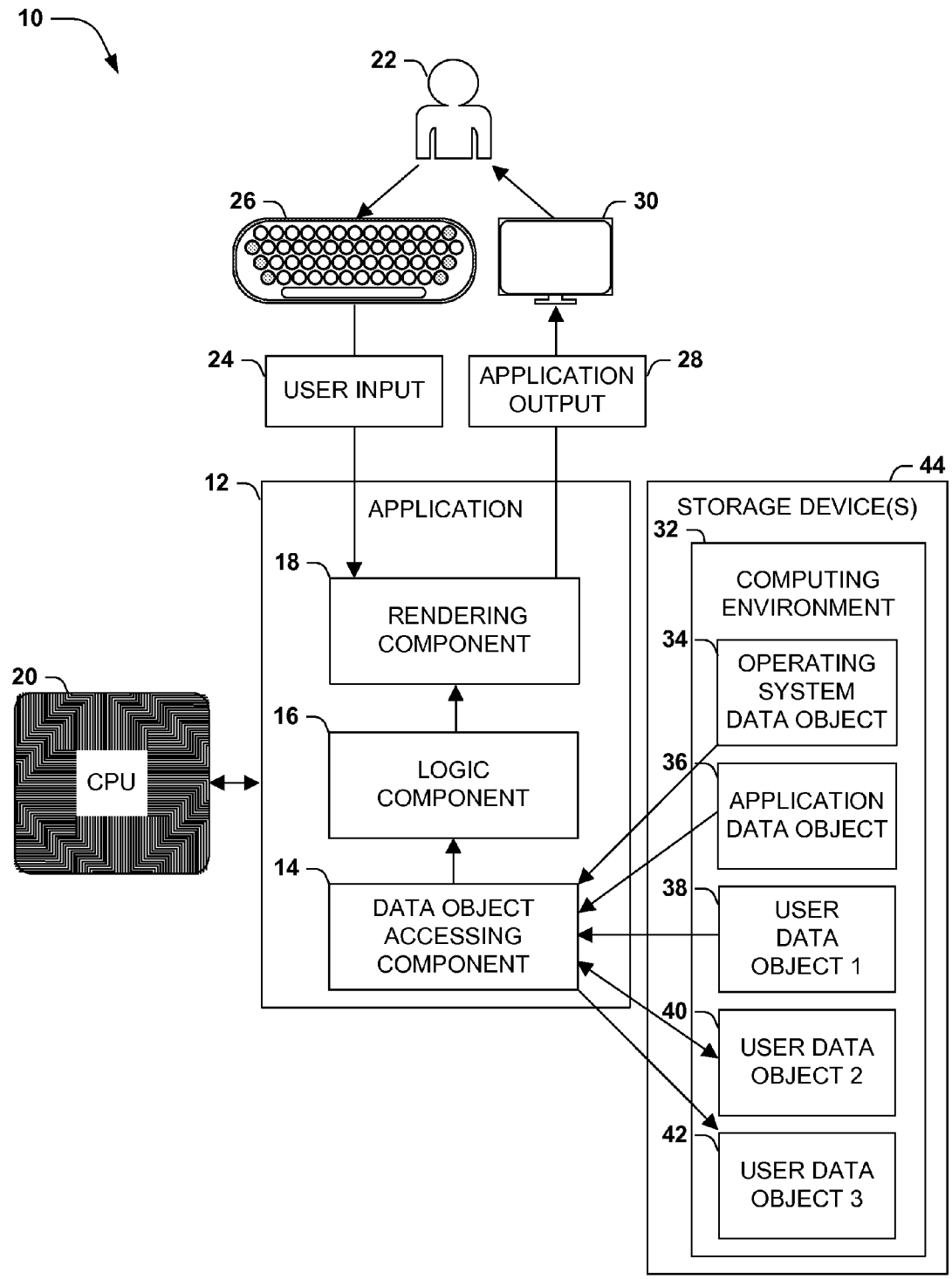
FIG. 1 is an illustration of an exemplary interaction of a user with an application that operates on a computing environment representation.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In the field of computing, a computer system involves a broad set of physical resources, such as processors, various types of memory and storage, hardware devices, networks accessed through communications adapters. Computer systems also involve a broad set of data objects, such as files stored in a filesystem organized on one or more of the storage devices, operating systems comprising sets of executable binaries that provide various services, applications comprising sets of application resources and configured to perform various tasks, application and operating system configuration information that may be stored in a system registry, user profiles and contacts representing various individuals, etc.

An application may be configured to execute natively on such a computer system, such as by communicating directly with the operating system to access various resources. For example, such applications may be permitted to interact with the filesystem with a full set of privileges accorded to the user on whose behalf the application executes, and comparatively unfettered access to the libraries and services provided by the operating system for such applications.

FIG. 1 illustrates an exemplary scenario 10 involving an application 12 comprising an application data object accessing component 14, an application logic component 16, and an application rendering component 18. The application 12 is configured to run on a processor 20 of a computer on behalf of a user 22, who may provide user input 24 via at least one input component 26 (such as a keyboard, a mouse, a microphone, or a touchscreen device), and the application 12 may provide application output 28 to the user 22 via at least one output component 30 (such as a display, a speaker, or a touch feedback device.) The application 12 may also access a computing environment 32, comprising various data objects stored on one or more storage devices 44 (such as a hard disk drive, an optical disk drive, or volatile or static memory.) The computing environment 32 in this example comprises an operating system data object 34 and an application data object 36, such as compiled binaries, libraries, or configuration data; a first user data object 38 that is read by the application 12; a second user data object 40 that is read and written by the application 12; and a third user data object 42 that is written by the application 12.

The application 12 illustrated in FIG. 1 may be structured in many ways, but one feasible structure of the application 12 is a clustering of tasks into three categories. A data object accessing component 14 may handle the accessing of the data objects in the computing environment 32 (e.g., invoking functions in libraries and interfaces of the operating system data object 34; reading some application configuration information from the application data object 36; and reading and writing various user objects stored on the storage device 44.) A logic component 16 may apply some operations using the data objects in the computing environment 32 (e.g., creating an image having user-defined properties, using various operations provided by the operating system.) The logic component 16 may perform such tasks by relying on the data object accessing component 14, such as writing the image as a particular user data object in the file system of the computing environment 32; invoking an operating system function through the operating system data object 34 to format the image according to a desired format, such as JPEG compression; and referring to a user preference stored as application configuration information in the application data object 36.) Accordingly, the data object accessing component 14 may achieve data-object-specific tasks, such as writing to a particular file, and may provide an opaque interface to the logic component 16 that focuses on task-specific but data-object-independent operations, such as reformatting an image according to a desired format. Finally, the operations implemented by the logic component 16 may be invoked through a user interface provided by a rendering component 18, and the results of such operations may be visualized therein (e.g., a graphics-editing package that allows a user to manipulate images according to the functions offered by the logic component 16.) This application design may be implemented explicitly (such as by arranging such functions in a series of interdependent modules representing various layers) and/or implicitly (by creating functions that rely on lower-level functions, such as a user-interface event handler that invokes an operation that invokes a data-object-specific function.)

As a second application design model, an application may be configured to execute in a virtual environment, comprising a virtual set of computing resources to which the operations of the application are limited. As a first example, the computer system may emulate a processor that supports a particular instruction set, such as Java. The application may issue operations to the emulated processor in Java, and the virtual environment may execute the application by translating the Java operations into instructions that the actual processor of the computer system may execute. As a second example, the virtual environment may provide to the application a virtual filesystem, wherein the application may store and access various files. However, the virtual environment might achieve the storing not by storing the files as particular files in the native filesystem of the computer system, but in a single large file that is internally structured to represent the various files, or in a separately organized filesystem, or even in the volatile memory space of the process executing the virtual environment.

Figure 2:
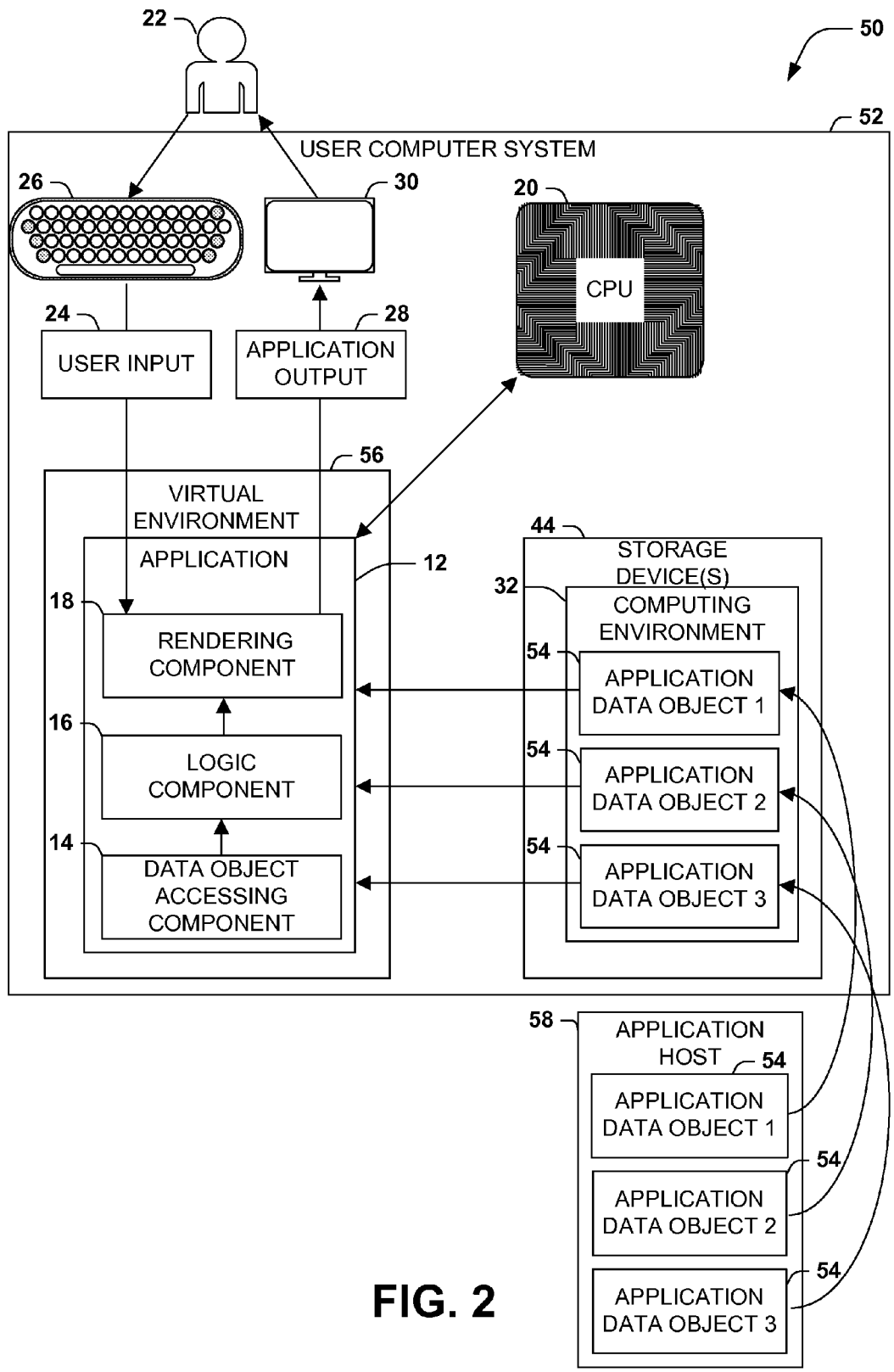
FIG. 2 is an illustration of an exemplary interaction of a user with an application that operates within a virtual environment on a computing environment representation.

FIG. 2 illustrates an exemplary scenario 50 featuring an application 12 executing in a virtual environment 56 of a computer 52. The computer 52 again comprises a processor 20 configured to execute various application 12, and a computing environment 32 stored in a series of storage devices 44, but a virtual environment 56 executing an application 12 may transform the operations of the application 12 into operations that may be executed by the processor 20. The computing environment 32 in this exemplary scenario 50 hosts a set of data objects 54 that together comprise the application 12, such as executable binaries, supporting libraries, data and media objects used in the application 12, etc. Moreover, the application 12 in this exemplary scenario 50 is provided by an application host 58, which may host the data objects 54 and may provide them to the computer 52 for storing in the computing environment 32. When a request is received (e.g., from a user 22) to execute the application 12, the data objects 54 comprising the application 12 are loaded into the virtual environment 56 for execution. In this manner, a virtual environment 56 may execute the application 12 provided by the application host 58 and represented in the computing environment 32 on the processor 20 of the computer 52.

Configuring the application to execute in the virtual environment rather than the native environment of the computer system may present several advantages. As a first example, if the application is designed to use a standardized computing environment, such as a virtual environment having particular and predictable properties, then any computer system capable of providing a virtual environment matching those properties may be able to execute the application. As a second example, virtualization isolates the application from the native elements of the computing environment; e.g., by limiting the application to a virtual filesystem, the virtual environment may prevent the application from accessing the files in the native filesystem, while still permitting the application to store files in order to perform various tasks. This isolation may be helpful where the application is not fully trusted, e.g., where the application may contain faulty or malicious instructions that might otherwise misuse or damage the resources of the computing environment, such as deleting files. This isolation may also be helpful for protecting the application from interference by other applications, e.g., where the application uses sensitive data to be protected from access by other applications.

A common example of a virtual environment is a web browser, which is configured to receive content from a webserver, such as HTML, scripts, and embedded media objects, and to present them to the user in the form of a website. In earlier generations of web browsers and websites, the content was predominantly passive, such as a plain page of text with embedded graphics. More recently, websites have become more interactive, an expanding set of web applications have been developed that execute within a website rendered by the web browser, such as an interactive media player, a game, or a document creation applet. However, a user of the web browser may not fully trust the website from which the web application was received, and the web application might be misconfigured (e.g., in such a manner as to crash the web browser or the operating system) or maliciously devised (e.g., in a manner that sends sensitive information stored in the computer system to third parties without the user's consent.) In order to permit users to execute such untrusted applications, web browsers provide a virtual environment wherein a web application may be executed in isolation from other web applications, applications executing outside of the web browser, and the resources of the computer system.

Thus, in many types of virtual environments (such as web browsers), a virtual environment may be provided to service various types of applications in isolation of the computer system. In particular, the application may be isolated from the set of data objects that comprise the user's computing environment, such as the user's files, the applications provided by the operating system, the application and operating system configuration information (such as preferences selected by the user for various applications), and the user accounts representing the users of the computer system. However, in some scenarios, a user may wish to allow the application to interact with such data objects. As a first example, a user of a document authoring application may wish to store documents created with the application not in a virtual filesystem isolated in the virtual environment, but in the native filesystem of the computing environment, so that such documents may later be accessed in other applications. As a second example, a user of an email application may wish to allow the application to access a set of contacts represented in the computing environment, such as a corporate directory. As a third example, a user of a media store application may wish to copy purchased media to other devices, or to archive purchased media to protect against data loss by storing it in the storage system of another computer.

In these and other scenarios, the virtual environment may be desirably configured to permit the application to access the data objects of the computing environment. However, the complexities of the computer system may complicate the accessing of the computing environment by the application. As a first example, because the data objects of the computing environment may comprise many types of data objects accessed through many types of data object systems (e.g., files accessed through a filesystem, database information accessed through a database system, application resources accessed through an assembly store, and application and operating system configuration accessed through a system registry), the application may not be properly configured to contend with the wide variety of data object systems and the access protocols of each system. As a second example, the data objects may be shared among various computers and devices that together comprise the computing environment of the user. For example, the computing environment may contain a reference to a data object (such as a shortcut), but accessing the data object may involve querying a server over a network where the data object is stored, or communicating with a device through a particular access protocol. In particular, if the computer system is occasionally connected to such other computers and devices, the computer system may comprise a local cache of such remotely stored data objects for offline access, and the local cache may confer unexpected properties upon such data objects (e.g., occasional synchronization of various representations of the data object among such computers and devices.) As a third example, access to the data object may be restricted to applications or users having certain permissions, which may be verified using various permission credentials (e.g., a username and authenticating password, or a check of permissions according to the computing environment.) As a fourth example, the application itself may be processed in a variety of manners; for example, the application may execute wholly on a local computer system, or different portions of the application may execute on different computer systems (e.g., an application host may mandatorily or optionally reserve the execution of some of the logic of the application, while the rendering of the user interface and receipt of user input may be delegated to a user's computer system.)

Thus, while it may be desirable to grant a virtualized application some measure of access the computing environment, the complexities of the computing environment may be difficult to negotiate. In particular, a designer of an application may have difficulty anticipating the broad range of data objects with which the application may interact, and may not wish to design the application in view of such complexities. For example, the developer anticipates that an application may often be used to access resources stored on occasionally connected computers and devices, and may recognize the benefit of a local cache of such data objects, but the developer may not wish to contend with the complexities of cache synchronization and maintenance. Moreover, per-application solutions to the complexities of the computing environment may be inefficient and cumbersome (e.g., several applications may application-specific local caches of the same data objects, entailing multiple local representations of the data object that are collectively synchronized among the caches) as compared with a broader solution (e.g., a single local cache that is serviced by a single synchronization process, and with which both virtual and native applications may interact.)

Accordingly, it may be desirable to implement a computing environment component that handles the complexities of the computing environment, such as interfacing with various data object systems, exchanging data objects with other computers and devices, managing and synchronizing caches of data objects, and factoring the logical components of an application across various computers. Such a component may permit applications to access the computing environment, while also transparently addressing the complex tasks that may be involved in providing such access.

The computing environment component may be accessible to virtual applications executing in a virtual environment, such as web applications executing in a web browser. However, it may be undesirable to configure the computing environment component as part of the virtual environment. As a first example, it may be advantageous to separate some functions of the computing environment component from the virtual environment. For example, the computing environment component may synchronize a local (cached) representation of a data object with a remote representation of the data object (such as on another computer) when the application executes in the virtual environment, but it may be desirable to perform the synchronization when the application is not executing in the virtual environment, or even when the virtual environment does not exist (e.g., when a web browser is not executing.) As a second example, it may be advantageous for the computing environment component to perform various services (such as data object accessing and cache maintenance and synchronization) not just on behalf of virtual applications, but also native applications and operating system processes, and to enable all such applications and processes to access these services in a consistent manner, such as through a programmatic interface that interacts consistently with all applications. Therefore, it may be desirable to implement the computing environment component to execute on the computer as a process outside of the virtual environment, so that services may be more broadly and consistently exposed and performed regardless of the status of the virtual environment.

However, if the computing environment component is implemented outside of the virtual environment, virtualized applications may be unable to access the component due to the isolation policies of the virtual environment. Therefore, a virtual environment interface may be devised that executes within the virtual environment and accesses the computing environment component on behalf of applications. For example, a virtualized application may comprise an operation referencing a data object for reading. The operation may be received by the virtual environment interface executing in the virtual environment, which may invoke the computing environment component to perform the operation on the data object. The computing environment component may access the data object, respecting all of the complexities of such accessing (e.g., through the particular data object system; retrieving the data object from another computer or device over a network, or referencing a locally cached representation of the data object, where the cache has been suitably synchronized; or verifying the permission of the application to access the data object), and may provide a representation of the data object to the application if successful. In this manner, a virtualized application may access the computing environment in a comparatively simple manner by submitting an operation to the virtual environment interface, which invokes the computing environment component executing outside of the virtual environment to perform the operation.

Additionally, the computing environment component and/or the virtual environment interface may provide a programmatic interface that allows applications to interact with the computing environment and the services applied thereto. For example, the virtual environment interface may be implemented as a programming library within the virtual environment that applications may invoke to access various data objects, or to interact with the services offered by the computing environment component (such as cache synchronization and remote accessing of data objects.) In addition, the programmatic interface may be designed in a familiar manner for application designers, such as in a language commonly used in virtual applications (e.g., a task-oriented language such as JavaScript, and/or an object-oriented language such as Java or C#), which may permit application developers to utilize the interface in an application without having to redesign or rewrite large portions thereof utilizing different programming techniques.

Figure 3:
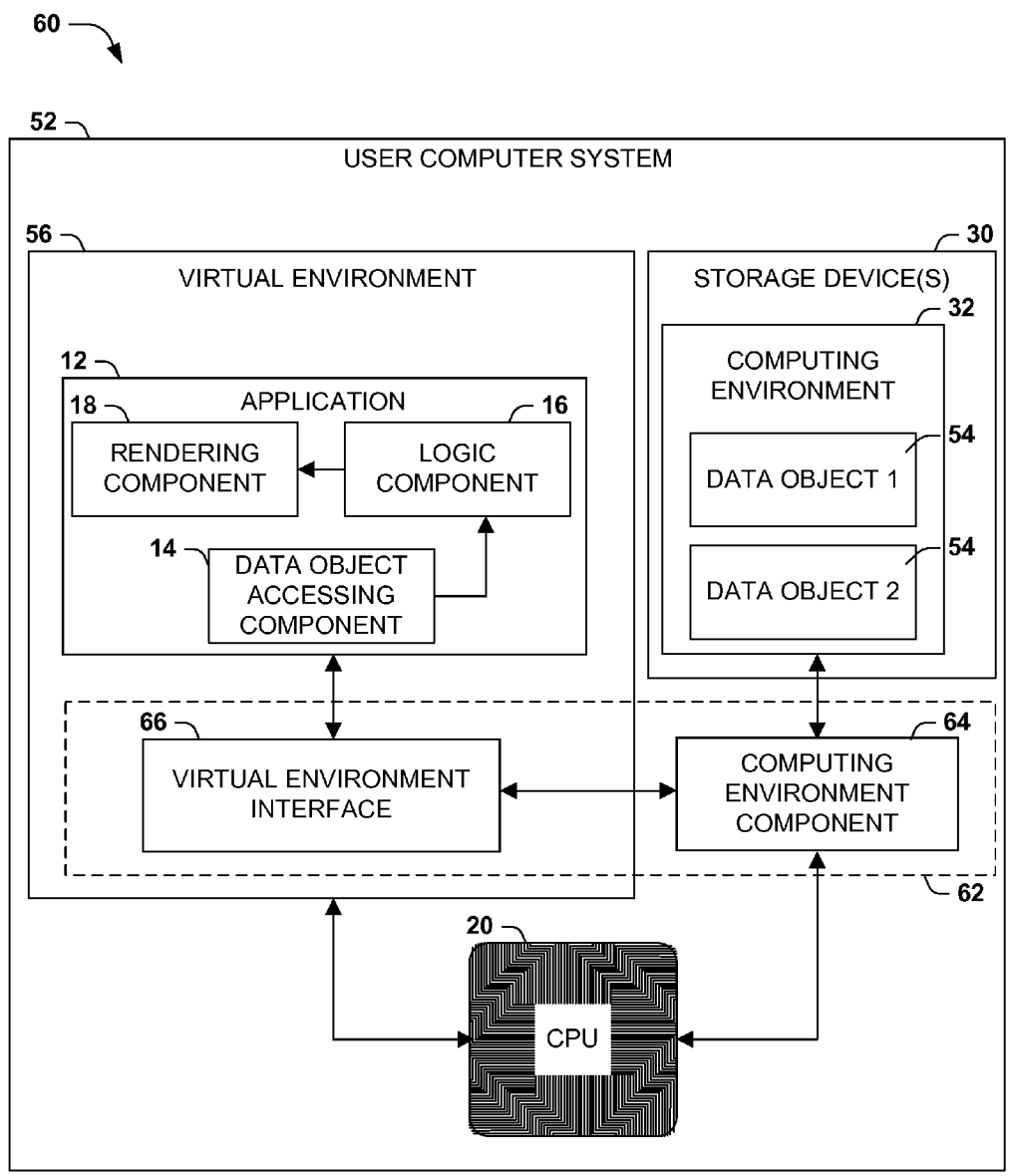
FIG. 3 is a component block diagram illustrating an exemplary system configured to execute an application within a virtual environment on a computer.

FIG. 3 illustrates an exemplary scenario 60 in which a computer 52 is configured to support the execution of virtual applications that may access the potentially large and diverse set of data objects in a computing environment 32. In this exemplary scenario 60, the computer 52 features a processor 20 that may execute one or more operating systems and various processes within, such as applications, services, and providers of virtual environments. This computer 52 also features a virtual environment 56, such as a web browser, which includes an application 12. The application 12 may be configured in many ways, and in this exemplary scenario 60 is configured as a data object accessing component 14, a logic component 16, and a rendering component 18 that execute together in the virtual environment 56. The computer 52 also includes at least one storage device 44 (and possibly a plurality of storage devices, such as a hard disk drive array or a combination of a hard disk drive and an optical disc placed in an optical drive) that together store a computing environment 32 comprising the aggregation of data objects 54 that comprise the computing environment of the computer 52. The computing environment 32 may comprise a large set of data objects 54 of various types, and the application 12 may be directed to the processing of a diverse set of data objects 54. Moreover, it may be undesirable to configure each application 12 to support such complexities, which may lead to unnecessarily duplicative application design.

In view of these complexities, the computer 52 may include two components that together support the execution of the application 12. The computer 52 may include a computing environment component 64 that is configured to access the data objects 54 comprising the computing environment 32. This computing environment component 64 may be capable of accessing many types of data objects 54 stored according to many techniques, such as a file system data object stored in a file system, a registry key stored in a system registry, a database data object stored in a relational database system, and a representation of a user account stored by the operating system and accessible through particular requests issued to the operating system. The computing environment component 64 may also be capable of identifying the location of a data object 54 requested by the application 12 in various storage devices 44 (such as a first hard disk drive, a second hard disk drive, a memory cache, and a file set offered by a remote computer system), submitting a request to the storage device 44 to retrieve the data object 54, and receiving the data object 54 from the storage device 44. Moreover, the computing environment component 64 may provide one or more services to the data objects 54. For example, for data objects 54 hosted on other computers or devices, the computing environment component 64 might form and manage a local representation of such data objects 54 in order to promote performance of applications that rely on such data objects 54. In this manner, the computing environment component 64 may be capable of accessing a large and diverse set of data objects 54 spanning multiple computers, devices, and file systems, yet may expose the entire set of such data objects 54 to applications as a unified set of data objects 54 that obscures much of the complexity in the details of accessing the data objects 54. Additionally, the computing environment component 64 might provide one or more services relating to the computing environment 32, such as a synchronization service that synchronizes different representations of one or more data objects 54 and a searching service that indexes various properties of data objects 54 (such as name, type, size, and semantic tags.) The computing environment component 64 might expose these services in a consistent manner to the user and any application relying on such data objects 54, and may provide such services automatically and in the background, thereby avoiding the redundant implementation of such features on a per-application basis.

In order to extend the functionality exposed by the computing environment component 64 to a virtual application, even to an untrusted application. A virtual environment interface 66 may be devised that executes within the virtual environment 56, accepts requests for operations on behalf of various applications 12, and delivers such requests to the computing environment component 64 executing outside of the virtual environment 56. The virtual environment interface 66 and/or the computing environment component 64 may also perform various security checks on such operations (e.g., verifying that the application 12 has permission to perform the requested operation on the specified data objects 54 of the computing environment 32, and authenticating the application, the source of the application, and/or a user of the application) prior to performing the operation, or after performing the operation but prior to committing the results of the operation.

In this manner, FIG. 3 illustrates an exemplary system 62 configured to execute an application 12 within a virtual environment 56 on a computer, comprising a computing environment component 64 executing outside of the virtual environment 56 and configured to apply operations on the computing environment 32, and a virtual environment interface 66 executing within the virtual environment 56 and configured to deliver operations to the computing environment component 64 on behalf of applications 12. For example, where the application 12 comprises at least one operation to be performed on the computing environment 32, the virtual environment interface 66 executing within the virtual environment 56 may be configured to invoke the computing environment component 64 in order to perform the operation on behalf of the application 12. This design may facilitate the accessing of the computing environment 32 by such applications 12, while also promoting security (such as by performing only permitted operations by authenticated applications) and without compromising isolation of the application 12 from other applications and unfettered access to the computing environment 32. The virtual environment interface 66 might also extend the capabilities of services provided by the computing environment component 64 to such virtualized applications 12, such as the capability of synchronizing local representations of data objects 54 used by the application 12 with remote representations thereof even when the application 12 is not running, and even if the virtual environment 56 does not exist (e.g., when a web browser is not operating.)

Additionally, the virtual environment interface 66 and/or the computing environment component 64 may provide a programmatic interface that permits applications 12 to interact with various aspects of the computing environment 32 and the services applied thereto. Moreover, these programmatic interfaces may be implemented in a familiar and well-established manner, which may permit applications to utilize the interfaces conveniently and without significant redesign. For example, a web browser plug-in designed to support web applications executing in for a web browser may expose a JavaScript-based programmatic interface, e.g., as a set of operations that may be invoked in JavaScript to read and write various data objects. Alternatively or additionally, the programmatic interface may support higher-level languages, e.g., object-oriented languages such as Java and C#; may expose more sophisticated details of the computing environment, such as the scheduling of the synchronization service, the freshness and policies of the local cache, and the relationships of the computers comprising the computing environment (e.g., which computer serves as the host of an authoritative representation of a particular data object); and/or may include more sophisticated programming constructs that permit more powerful programmatic access (e.g., event subscriptions and data feeds that may notify applications of computing environment events, such as the synchronization of a particular data object.) In this manner, the programmatic interface may expose a wide variety of aspects of the computing environment in a sophisticated manner, while also adhering to familiar programming models that may be readily adopted by developers while reducing application redesigning.

Figure 4:
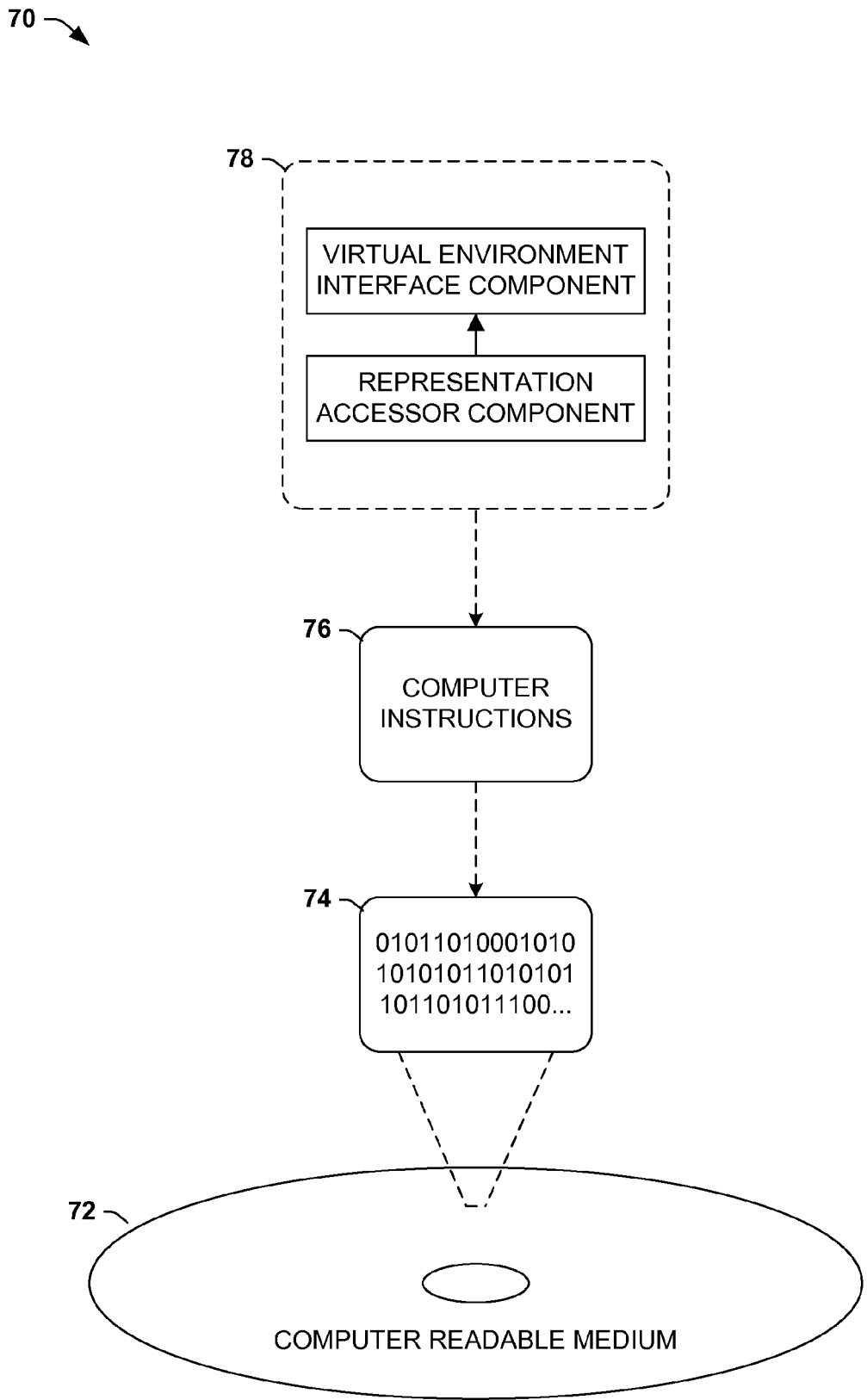
FIG. 4 is an illustration of an exemplary computer-readable medium comprising processor-executable instructions configured to embody one or more of the provisions set forth herein.

FIG. 4 illustrates a second embodiment of a system utilizing this architecture, comprising as a computer-readable medium comprising processor-executable instructions configured to apply the techniques presented herein. An exemplary computer-readable medium that may be devised in these ways is illustrated in FIG. 4, wherein the implementation 70 comprises a computer-readable medium 72 (e.g., a CD-R, DVD-R, or a platter of a hard disk drive), on which is encoded computer-readable data 74. This computer-readable data 74 in turn comprises a set of computer instructions 76 representing an exemplary system 78 configured to execute an application 12 within a virtual environment 56 on a computer, comprising a computing environment component 64 executing outside of the virtual environment 56 and configured to access the data objects 54 in the computing environment representation 32, and a virtual environment interface 66 that executing within the virtual environment 56 and may invoke the computing environment component 64 to perform various operations on behalf of applications 12 also running in the virtual environment 56, such as described with reference to FIG. 3. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary system 62 of FIG. 3 and the exemplary computer-readable medium 92 of FIG. 4) to confer individual and/or synergistic advantages upon such embodiments.

A first aspect that may vary among embodiments of these techniques relates to the type of virtual environment 56 in which the application 12 is executed. As a first example, the virtual environment 56 may comprise a virtual machine, such as a Java virtual machine that is generated by a Java runtime on behalf of a Java application. The virtual environment interface 66 may be embodied therein as a programming library that serves as a proxy for the computing environment component 64, e.g., by translating Java function invocations of the application 12 into a format that is operable by the computing environment component 64. As a second example, the virtual environment 56 may comprise a web browser, and the virtual environment interface 66 may be embodied in a web browser plug-in configured to interface with the computing environment component 64, e.g., by accepting operations from web applications embedded in various websites and accordingly invoking the computing environment component 64. In this scenario, it may be advantageous to design the web browser plug-in to provide a programmatic interface in a language that is commonly used in web applications, such as JavaScript, so that the web browser plug-in may be utilized by developers in a convenient manner. Those of ordinary skill in the art may devise many types of virtual environments 56 in which the techniques discussed herein may be utilized.

A second aspect that may vary among embodiments of these techniques relates to the type of computing environment to which these techniques may be utilized. In order to reduce the complex variety and decentralization of the objects comprising a contemporary computing environment, a deployable representation of the computing environment may be devised, where the objects comprising the computing environment are organized in a data object hierarchy, which may be hosted by a computing environment host. If the data objects are represented in a uniform manner and managed in a consistent way by a data object system, a set of services may be devised to apply to all of the data objects of the computing environment. Moreover, the data object hierarchy may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.) With relation to the concept of a deployable computing environment, it may be advantageous to configure at least one server to manage one or more data objects within the representation, and to accept operations sets to be applied to such data objects. A user of the deployable computing environment may therefore interact with the deployable computing environment in a platform- and device-independent manner, while also achieving at least some of the advantages over alternative accessing techniques, such as synchronous or asynchronous invoking, batching of standard operations, and mobile agents. However, those of ordinary skill in the art may devise many such scenarios in which the techniques discussed herein may be applied.

Figure 5:
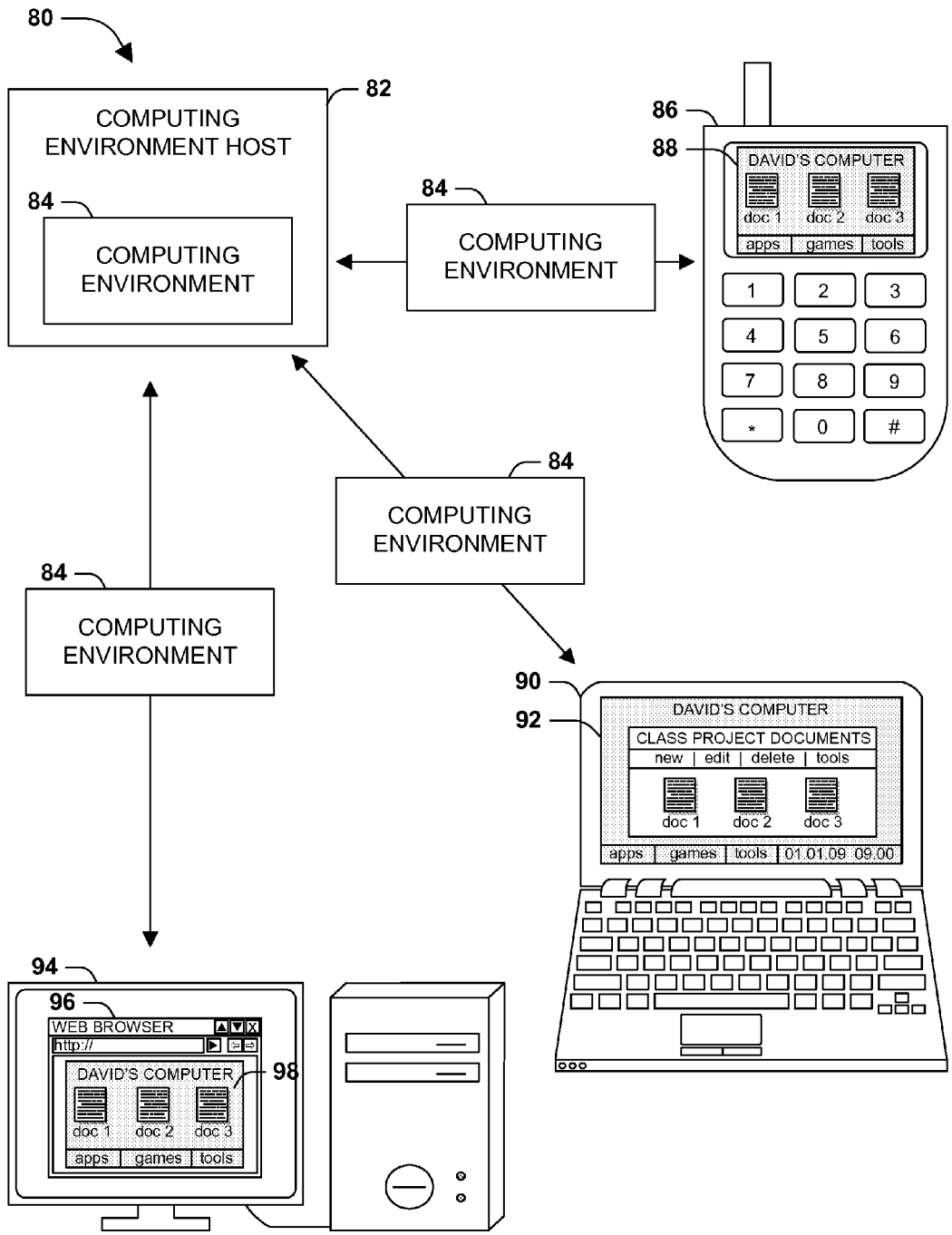
FIG. 5 is an illustration of an exemplary interaction of a computing environment host with various computing environment rendering devices.

FIG. 5 illustrates one such scenario 80, wherein the computing environment may be hosted by a computing environment host 82, which may store and manage a deployable computing environment 84. The computing environment host 82 may also render the deployable computing environment 84 in different ways on behalf of various devices, such as a cellphone device 86, a personal notebook computer 90, and a public workstation 94, and also on behalf of different types of users having different access privileges. The rendering of the computing environment therefore reflects a consistent computing environment across all devices that expose the same applications, user profiles, shell configuration, user data objects, etc. Thus, a user may access a full-featured version 92 of the computing environment through a high-performance notebook computer, a stripped-down version 88 of the computing environment on a low-power cellphone device 86, and a browser-compatible and privacy-oriented version 98 of the computing environment through a web browser 86 of a public terminal 94. To the extent that the capabilities of each such device support the rendering of the computing environment, a consistent user interface and data set may be presented due to the rendering of the deployable computing environment 84 adjusted to the capabilities of each device. Updates to the computing environment may be propagated back to the computing environment host 82, and may be automatically synchronized with other devices. The various devices may also cooperate by sharing locally stored data with other devices, and by controlling or being controlled by other devices. Hence, the computing environment may therefore be devised and presented as a cloud computing architecture, comprising a device-independent representation (a "cloud") expressed as a consistent rendering across all devices ("clients") that form a mesh of cooperating portals (with device-specific properties) to the same computing environment. Specifically with respect to the applications of the computing environment, the deployable computing environment 84 may include a representation of the application set, the application resources, and the data objects created thereby. Moreover, the computing environment host 82 may apply services to the various objects comprising the data object hierarchy 32, and the common format in which the data objects are stored in the deployable computing environment 84 may facilitate consistent availability and application of the services regardless of the nature of the data objects applied thereto.

The techniques discussed herein may be implemented in a computer 52 having a deployable computing environment 84 in a particularly advantageous manner. As a first example, the A third aspect that may vary among embodiments of these techniques relates to the types of operations that may be performed by the computing environment component 64 upon invocation by the virtual environment interface 66. In a simple implementation, the computing environment component 64 may be configured to read and write data objects in the computing environment on behalf of various applications 12. As a first example, if the operation specifies a retrieving of at least one data object 54 from the computing environment 32 to be used by the application 12, the computing environment component 64 may retrieve the data object(s) 54 from the computing environment 32 and deliver the data object(s) 54 to the virtual environment interface 66, which may receive the data object(s) 54 from the computing environment component 64 deliver the data object(s) 54 to the application 12. Conversely, if the operation specifies a writing of at least one data object 54 to the computing environment 32 by the application 12, the virtual environment interface 66 may deliver the data object(s) 54 to the computing environment component 64, which may receive the data object(s) 54 and write the data object(s) 54 to the computing environment 32. As a more capable example, the computing environment component 64 may be able to exchange data objects 54 with remote computers that host at least portion of the computing environment 32. For example, a particular computer (such as a cellphone) may host a particular set of data objects 54 (such as telephone contacts) that are referenced within the computing environment, but that may only be accessed by contacting the particular computer and requesting the data objects 54. Accordingly, where a data object 54 comprises a remote data object stored in a portion of the computing environment 32 hosted by a remote computer, the computing environment host 64 may be configured to retrieve the remote data object from the remote computer, e.g., in order to perform a retrieving operation on behalf of an application 12, and may deliver the data object 54 to the remote computer for storing in the portion of the computing environment 32, e.g., in order to perform a writing operation on behalf of the application 12. Advanced operations might also be supplied by the computing environment component 64 (e.g., comparing or verifying data objects 54, locking data objects 54 for exclusive access, and compressing or encrypting data objects 54.)

An additional feature that may be implemented with regard to the reading and writing of data objects 54 involves a comparatively low-level programmatic interface that allows applications 12 to participate in operations on data objects 54. For example, the virtual environment component 66 may expose to applications 12 executing in the virtual environment 56 a programmatic interface, e.g., having at least one operation configured to write a data object 54 to the computing environment 32, and at least one operation configured to retrieve a data object 54 from the computing environment 32. Other operations may also be included, which may reflect per-data-object operations of which the computing environment component 64 is capable, such as locking a data object 54 for exclusive access or releasing such a lock. The programmatic interface may be exposed by the computing environment component 64 and/or the virtual environment component 66 (e.g., the virtual environment component 66 may be structured as a proxy with a set of proxy functions that, upon invocation by an application 12, invoke respective functions of the computing environment component 64.) The programmatic interface may also be designed in many ways, e.g., using one or several of the many available programming languages and constructs. As one such example, a programmatic interface exposed in a virtual environment 56 comprising a web browser that serves web applications may be devised according to one or more common web programming languages, such as JavaScript. However, those of ordinary skill in the art may devise many techniques for configuring the computing environment component 64 and the virtual environment interface 10 to operate on data objects 54 on behalf of applications 12 while implementing the techniques discussed herein.

A fourth aspect that may vary among embodiments of these techniques relates to services that may be applied to the computing environment 32 that may beneficially support applications 12 executed both natively and in the virtual environment 56. As a first example, the computing environment component 64 may be configured to apply at least one service to the computing environment 32, such as a synchronization service, a caching service, and a remote data object accessing service. In one such scenario, the computing environment 32 may comprise a deployable computing environment 84, such as described with reference to FIG. 5 and illustrated therein, wherein various representations of the computing environment 32 may exist on a set of computers and devices. In this scenario, at least one service offered by the computing environment component 64 may comprise a synchronization service, which may be configured, e.g., to synchronize at least a portion of the computing environment 32 on the computer 52 with a second representation of at least a portion of the computing environment 52, such as may be stored on a second computer.

Many such services may be advantageously provided by the computing environment component 64 in this scenario. As a first example, the synchronization of the deployable computing environment 84 among the set of computers and devices may promote the automated installation of an application 12 on several such devices, which may therefore exist in the computing environment 32 regardless of which computer or device is used to access the computing environment 32. In a first such scenario, the computing environment 32 on a computer 52 may comprise at least one application resource of an application 12 that is not installed on a second computer having a representation of the computing environment 32. A synchronization service provided by a computing environment component 64 may promote the installing of the application 12 on the second computer by sending the at least one application resource of the application 12 to the second computer to be installed on the second computer. Conversely, if the representation stored on the second computer comprises at least one application resource of an application 12 that is not installed in the computing environment 32 of the computer 52, the computing environment component 64 may be configured, upon receiving the application resource from the representation during a synchronizing, to install the application in the computing environment 32 on the computer 52 using the at least one application resource. As a second example, an operation to be performed by an application 12 may be associated with a permission based on at least one permission criterion. For example, the operation may specify a protected operation or a protected set of data objects 54, such as an accessing of a sensitive area of the computing environment 32. This operation may therefore be executed by the processor 20 only upon verifying the permissions, according to at least one permission criterion presented by the application 12 (e.g., an authenticating username and password, or a security certificate.) The computing environment component 64 may therefore be configured to perform the at least one operation by verifying the at least one permission criterion (e.g., by contacting an authentication service to authenticate the identity of the application 12 or the user 22), and upon verifying the permission credentials, may perform the operation.

Moreover, these services may be exposed to applications 12 through a programmatic interface, comprising at least one operation relating to at least one service. For example, the programmatic interface may be exposed by the computing environment component 64 to allow applications 12 to interact with the services, e.g., to invoke a synchronization of various representations of the computing environment 32 on various computers and devices, and/or to provide information about such services, e.g., the date and time on which such a synchronization was last performed. The programmatic interface may also be exposed in many programming languages, such as Java or C#, and may support high-level programming languages featuring more powerful programmatic constructs that enable the application 12 to interface with the computing environment component 64 in a more sophisticated manner (e.g., an event subscription service or an information feed service that actively notifies the application 12 upon the occurrence of events of interest.) Those of ordinary skill in the art may devise many services that may be applied to a computing environment 32 by a computing environment component 64, and many techniques for exposing such services to applications 12, while implementing the techniques discussed herein.

A fifth aspect that may vary among embodiments of these techniques relates to the availability of an instance of the computing environment component 64 and the virtual environment interface 66 on the computer 52, and techniques for handling an unavailability of either or both components. When an application 12 is loaded in the virtual environment 56, the computer 52 may determine that the application is to be supported by such components of the system 62 (e.g., in order to interface with the computing environment representation 32 or to execute in one of several execution contexts), but that one or more components of the system 62 are unavailable. The computer 52 may respond by initiating the installation of the system 62 prior to executing the application 12. In one such scenario, the computer 52 may load an application 12 into the virtual environment 56. The computer 52 may determine that the application 12 relies on the virtual environment interface component 66 in order to access the computing environment representation 32 through a representation accessor component 64, but may also determine that one or both of the representation accessor component 64 and the virtual environment interface component 66 are not installed on the computer 52. As a first example, the virtual environment 56 of the computer 52 may endeavor to detect an instance of the virtual environment interface component 66 (e.g., while initiating the execution of the application 12 in a virtual execution context), and upon failing to detect such an instance, may install an instance of the virtual environment interface component 66 within the virtual environment 56 of the computer 52. As a second example, the virtual environment interface component 66 may be configured to detect an instance of the representation accessor component 64 available on the computer 52, and upon failing to detect such an instance, may install an instance of the representation accessor component 64. Such components might be available in installable form via the application host 58. Alternatively, the components might be available from an identified source; e.g., the application 12 may identify a source for the installable components, or the computer 52 may contact an application management service (such as an operating system updating service) to request installable versions of the components. This installation may also be performed automatically, or may be conditioned upon user authorization of the downloading and installation of the missing components.

Alternatively, if the representation accessor component 64 is unavailable (e.g., if the installation of the representation accessor component 64 fails or if the user withholds permission to install the representation accessor component 64), the virtual environment 56 may be configured to execute the application within a computing environment host 82 having access to the computing environment representation 32. For example, the virtual environment may send the application 12 to the computing environment host 82, and upon receiving output of the application 12 from the computing environment host 82, may render the output within the virtual environment 56 (e.g., within a web browser.) In this manner, the virtual environment 56 may reconfigure the application 12 as a thin-client application by delivering it for execution on a computer system that has access to the computing environment representation 32, and by only rendering the output of the application. Those of ordinary skill in the art may devise many other ways of achieving such installation while implementing the techniques discussed herein.

Figure 6:
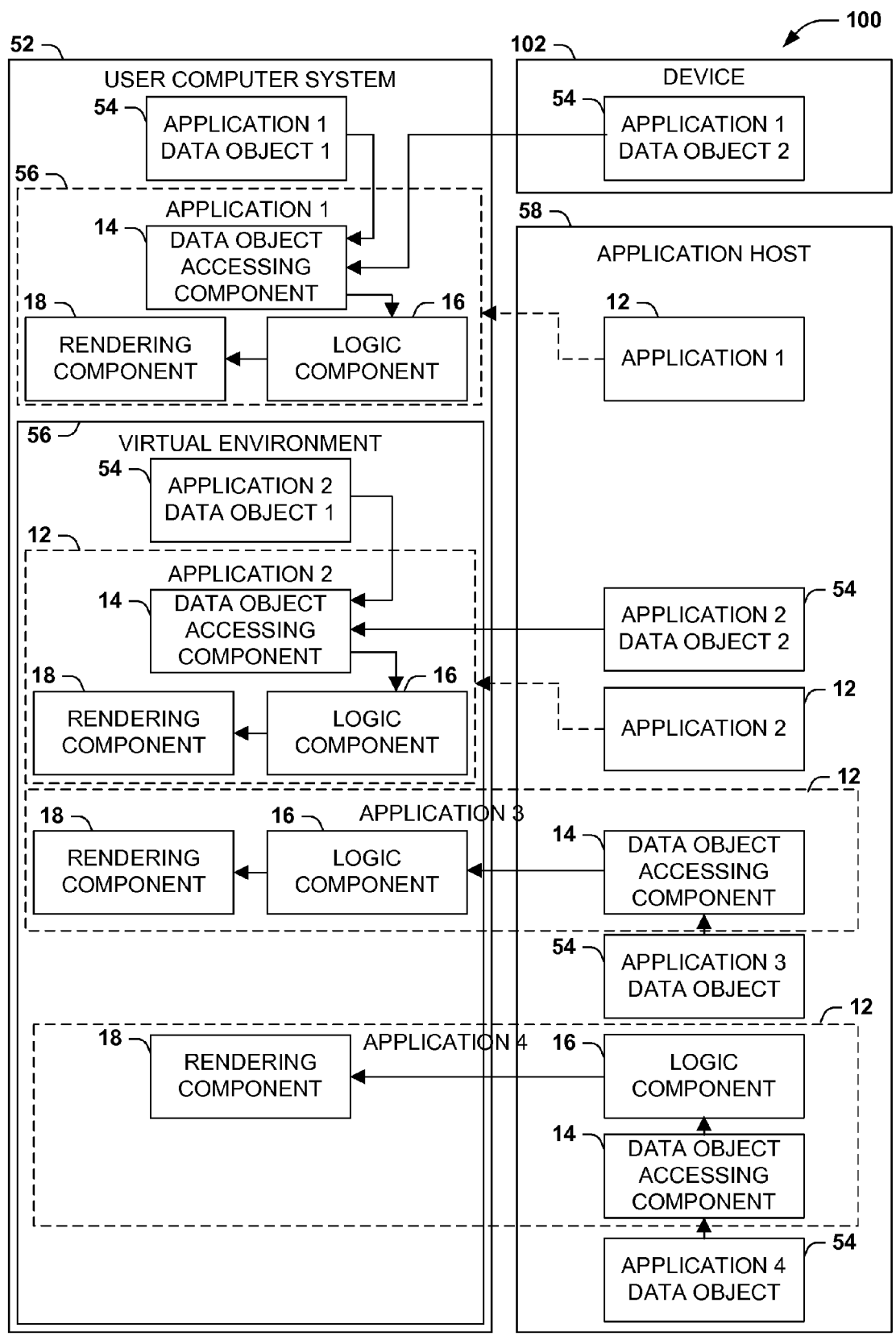
FIG. 6 is an illustration of several exemplary interactions of applications with an application host.

FIG. 6 illustrates an exemplary scenario 100 featuring a set of applications that illustrate variations in the factored execution of an application. In these scenarios, an application host 58 provides at least part of respective applications to a computer 52 operated by a user and configured to execute at least part of the application. A first application 12 hosted on the application host 58 may be provided wholly to the computer 52, which may natively execute the first application 12 within the operating system. In accordance with the architecture illustrated in FIG. 1, the first application 12 comprises a data object accessing component 14 configured to access a first data object 54 used by the first application 12, such as a file stored in the file system of the computer 52; a logic component 16 that provides one or more operations using the data-object-specific accessing functions provided by the data object accessing component 14; and a rendering component 18 that translates user input into operations exposed by the logic component 16 and/or provides rendering output generated by the first application 12. One scenario wherein the first application 12 may arise is with an application provided as an installation package by the application host 58 that a user downloads, installs, and locally executes as a native application within the operating system, and which may receive by delegation any privileges associated with the user (such as permission to access the first data object 54 in the file system of the computer 52.) This first application may be capable of executing in a disconnected state, when the computer 52 cannot contact the application host 58. However, even this example may be complicated, such as if the user wishes to sue the application with a second data object 54 (such as a file) hosted on a device 102, such as a cellphone or a portable media player. If the user wishes to use the first application 12 with such external devices, the first application 12 (and in particular, the data object accessing component 14 of the first application 12) may have to support accessing such data objects on a wide array of devices.

FIG. 6 also illustrates some applications that may execute on the computer 52 within a virtual environment 12, such as a web browser. Virtual environments are often used to isolate part or all of an application from system resources, such as aspects of the computing environment representation (e.g., the file system and user profiles) and/or to provide capabilities for a particular subset of applications executable on the computer (e.g., a Java virtual machine capable of executing Java-based applications in a standardized environment, regardless of the capabilities of the system in which the Java virtual machine is provided.) In particular, virtual environments are useful for executing comparatively untrusted code that may be provided by an untrusted application host 58. For example, in the field of web development, a user may use a web browser to visit an untrusted website that involves a web application. Rather than permitting the untrusted application to run on the computer system with all of the privileges of the user (such as comparatively broad access to the local file system), the web browser may isolate the application in a virtual environment that restricts access to a subset of system resources, such as a small application cache reserved for the domain of the untrusted website. Such virtualization may also be useful for isolating the application from interference by other applications, such as other untrusted applications from other servers that may attempt to corrupt or extract data from the application; the isolation of the application within the virtual environment may prevent such interference from other applications.

While virtual environments may be helpful for isolating applications and providing new capabilities (such as standardized interfaces and resources), the isolation within a virtual environment such as a web browser may complicate the architecture of the application. As illustrated in FIG. 6, the application host 58 may host a second application 12, which may again be wholly delivered to the computer 52 for local execution. The second application 12 may again comprise a data object accessing component 14, a logic component 16, and a rendering component 18; however, the data object accessing component 14 may be limited by the isolation of the virtual environment 12 to a smaller set of data objects, such as a first application object 68 stored within the virtual environment 12 (e.g., cookies stored in a cookie cache of a web browser.) In contrast with the first application 12, the data object accessing component 14 of the second application 12 may have to be configured to access data objects within the virtual environment 12. Moreover, the second application 12 may also be configured and permitted to utilize resources stored on the application host 58, such as objects stored on a webserver. The second application 12 may therefore have to be configured to access items over a network that may or may not be available, and that may vary in relevant aspects, such as bandwidth and latency. Such configuration may therefore complicate the design and execution of the second application 12 in comparison with applications that are only locally executed, such as the first application 12.

The architecture illustrated in FIG. 1 may be further complicated if the execution of an application is distributed over multiple computers, such as the computer 52 and the application host 58 of FIG. 6. The application host 58 may host a third application 12, which may again comprise a data object accessing component 14, a logic component 16, and a rendering component 18. However, the application may be distributed, such that the data object accessing component 14 may execute only on the application host 58 while the rendering component 18 and the logic component 16 may execute within the virtual environment 12 (such as a web browser) of the computer 52. In such applications, the application host 58 may reserve the data storage and accessing capabilities, such as the accessing of a third application data object 54, but may deliver data to the logic component 16 of the third application 12 running in the virtual environment 12 of the computer 52. One scenario where this factoring may arise is a server/client data-driven application, such as a database application, where the application host 58 handles requests provided by a user through the web browser, and the logic component 16 executing within the web browser performs various logic on the data supplied by the application host 58, and the rendering component 18 renders output to the user via the web browser. In such scenarios, the third application 12 may have to be configured to utilize the data object accessing functions provided by the application host 58, which may involve (e.g.) functions for locating the application host 58 and communicating with the application host 58 over a network, and may also involve techniques for promoting availability and/or performance, such as local caching of data objects supplied by the application host 58. In still another variation, FIG. 6 also illustrates a fourth application 12 provided by the application host 58 and distributed across the application host 58 and the computer 52, but wherein the application host 58 reserves both the data object accessing component 14 and the logic component 16 and the accessing of a fourth application data object 54, and provides to the computer 52 only the rendering component 18 configured for execution within the virtual environment 12 (such as a web browser.) One scenario where this factoring may arise is with a thin client application, such as a remotely hosted database application offering a web interface to database users. Whereas the third application 12 might provide many forms of database-stored data objects for client-side manipulation, the fourth application 12 may reserve most or all database logic in order to promote database integrity, may expose only a web interface through which users may submit database requests to the database host for processing, and may provide responses and output rendered as web pages.

As illustrated by the various applications in FIG. 6, even if the architecture of an application may be organized (explicitly or implicitly) into a data object accessing component, a logic component, and a rendering component, the details of the architecture may vary significantly based on the context in which the application is executed. Additional variations may also be devised (e.g., the logic component may also be distributed across the computer 52 and the application host 58, or the data object accessing component 14 may be configured to access data objects hosted on additional systems, such as a distributed database system.) Moreover, an application may be adaptable for execution in several contexts, such as wholly local execution as a native application, wholly local execution within a virtual environment (such as a web browser), and/or distributable application involving an application host. It may be appreciated that the design and implementation of an application may be significantly complicated by the variability of executing contexts in contemporary computer systems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Figure 7:
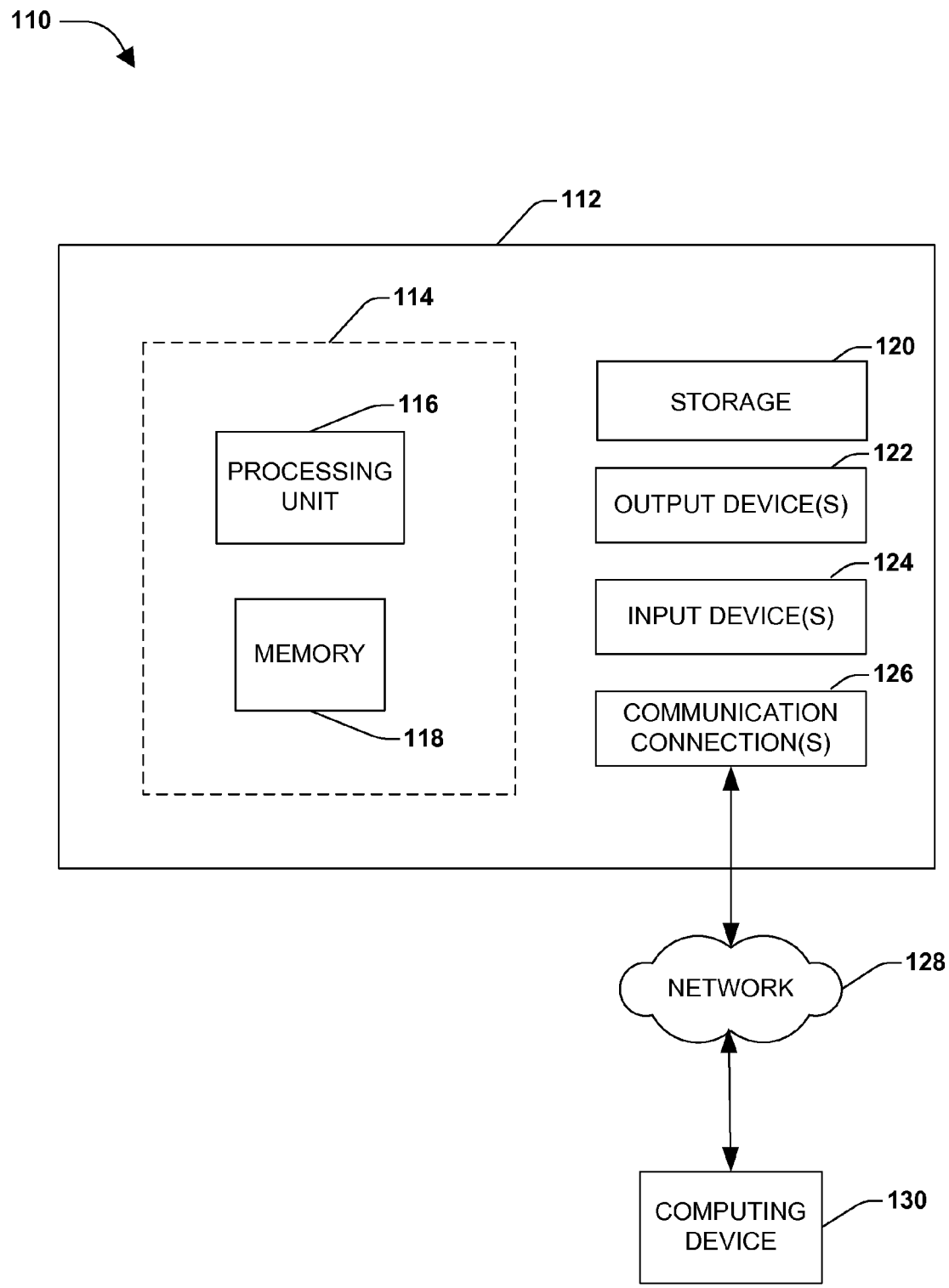
FIG. 7 illustrates an exemplary computing environment wherein one or more of the provisions set forth herein may be implemented.

FIG. 7 illustrates an example of a system 110 comprising a computing device 112 configured to implement one or more embodiments provided herein. In one configuration, computing device 112 includes at least one processing unit 116 and memory 118. Depending on the exact configuration and type of computing device, memory 118 may be volatile (such as RAM, for example), non-volatile (such as ROM, flash memory, etc., for example) or some combination of the two. This configuration is illustrated in FIG. 7 by dashed line 114.

In other embodiments, device 112 may include additional features and/or functionality. For example, device 112 may also include additional storage (e.g., removable and/or non-removable) including, but not limited to, magnetic storage, optical storage, and the like. Such additional storage is illustrated in FIG. 7 by storage 120. In one embodiment, computer readable instructions to implement one or more embodiments provided herein may be in storage 120. Storage 120 may also store other computer readable instructions to implement an operating system, an application program, and the like. Computer readable instructions may be loaded in memory 118 for execution by processing unit 116, for example.

The term "computer readable media" as used herein includes computer storage media. Computer storage media includes volatile and nonvolatile, removable and non-removable media implemented in any method or technology for storage of information such as computer readable instructions or other data. Memory 118 and storage 120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 112. Any such computer storage media may be part of device 112.

Device 112 may also include communication connection(s) 126 that allows device 112 to communicate with other devices. Communication connection(s) 126 may include, but is not limited to, a modem, a Network Interface Card (NIC), an integrated network interface, a radio frequency transmitter/receiver, an infrared port, a USB connection, or other interfaces for connecting computing device 112 to other computing devices. Communication connection(s) 126 may include a wired connection or a wireless connection. Communication connection(s) 126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 112 may include input device(s) 124 such as keyboard, mouse, pen, voice input device, touch input device, infrared cameras, video input devices, and/or any other input device. Output device(s) 122 such as one or more displays, speakers, printers, and/or any other output device may also be included in device 112. Input device(s) 124 and output device(s) 122 may be connected to device 112 via a wired connection, wireless connection, or any combination thereof. In one embodiment, an input device or an output device from another computing device may be used as input device(s) 124 or output device(s) 122 for computing device 112.

Components of computing device 112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 112 may be interconnected by a network. For example, memory 118 may be comprised of multiple physical memory units located in different physical locations interconnected by a network.

Those skilled in the art will realize that storage devices utilized to store computer readable instructions may be distributed across a network. For example, a computing device 112 accessible via network 128 may store computer readable instructions to implement one or more embodiments provided herein. Computing device 112 may access computing device 130 and download a part or all of the computer readable instructions for execution. Alternatively, computing device 112 may download pieces of the computer readable instructions, as needed, or some instructions may be executed at computing device 112 and some at computing device 130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-readable storage device encoding instructions that, when executed on a processor of a computer having a computing environment, cause the computer to apply an operation of an application executing within a virtual environment, the instructions comprising:
 a computing environment component that, when executed on the processor outside of the virtual environment, applies the operation to the computing environment and to apply at least one service to the computing environment including a synchronization service configured to synchronize at least a portion of the computing environment on the computer with a copy of at least a portion of the computing environment, and
 a virtual environment interface that, when executed on the processor within the virtual environment, delivers the operation to the computing environment component on behalf of the application.

2. The computer-readable storage device of claim 1:
the virtual environment comprising a browser, and
the virtual environment interface comprising a browser plug-in configured to interface with the computing environment component.

3. The computer-readable storage device of claim 1:
the operation specifying a retrieving of at least one data object from the computing environment to be used by the application;
the computing environment component configured to:
 retrieve the at least one data object from the computing environment, and
 deliver the at least one data object to the virtual environment interface; and
the virtual environment interface configured to:
 receive the at least one data object from the computing environment component, and
 deliver the at least one data object to the application.

4. The computer-readable storage device of claim 3:
at least one data object comprising a remote data object stored in a portion of the computing environment hosted by a remote computer, and
retrieving the at least one data object comprising retrieving the at least one remote data object from the remote computer.

5. The computer-readable storage device of claim 1:
the operation specifying a writing of at least one data object to the computing environment by the application;
the virtual environment interface configured to deliver the at least one data object to the computing environment component; and
the computing environment component configured to:
 receive the at least one data object, and
 write the at least one data object to the computing environment.

6. The computer-readable storage device of claim 5:
at least one data object comprising a remote data object to be stored in a portion of the computing environment hosted by a remote computer, and
writing the at least one data object comprising: delivering the at least one data object to the remote computer for storing in the portion of the computing environment.

7. The computer-readable storage device of claim 1, the virtual environment interface comprising a programmatic interface comprising:
at least one operation configured to write a data object to the computing environment, and
at least one operation configured to read a data application in the computing environment.

8. The computer-readable storage device of claim 1, the computing environment component comprising a programmatic interface comprising at least one operation relating to at least one service.

9. The computer-readable storage device of claim 1:
the computing environment hosted by a computing environment host, and
the synchronization service configured to synchronize the computing environment with the copy hosted by the computing environment host.

10. The computer-readable storage device of claim 1, the copy of the computing environment stored on a second computer represented in the computing environment.

11. The computer-readable storage device of claim 10:
the computing environment comprising at least one application resource of an application that is not installed on the second computer, and
the synchronization service configured to send the at least one application resource to the second computer to be installed on the second computer.

12. The computer-readable storage device of claim 1:
the computing environment comprising at least one application resource of an application that is not installed in the computing environment on the computer, and
the computing environment component configured, upon receiving the application resource from the copy of the computing environment during synchronizing, to install the application in the computing environment on the computer using the application resource.

13. The computer-readable storage device of claim 1:
the operation associated with a permission based on at least one permission criterion, and
the computing environment component configured to perform at least one operation on behalf of the application comprising:
verifying the at least one permission criterion, and
upon verifying the at least one permission criterion, performing the at least one operation on the computing environment on behalf of the application.

14. The computer-readable storage device of claim 1, the virtual environment configured to:
detect an instance of the computing environment component accessible to the computer; and
upon failing to detect an instance of the computing environment component, install an instance of the computing environment component on the computer.

15. The computer-readable storage device of claim 1, the virtual environment configured to:
detect an instance of the virtual environment interface accessible to the computer; and
upon failing to detect an instance of the virtual environment interface, install an instance of the virtual environment interface on the computer.

16. The computer-readable storage device of claim 15:
the computing environment comprising a deployable computing environment hosted by a computing environment host configured to execute an application on behalf of the computer; and
the virtual environment configured, upon failing to detect an instance of the computing environment component or an instance of the virtual environment interface, to:
send the application to the computing environment host, and
upon receiving output of the application from the computing environment host, render the output within the virtual environment.

17. A computer-readable storage device encoding instructions that, when executed on a processor of a computer having a computing environment, cause the computer to apply an operation of an application executing within a virtual environment comprising a browser the instructions comprising:
a computing environment component that, when executed on the processor outside of the virtual environment:
applies the operation to the computing environment on behalf of the application;
applies at least one service to the computing environment, including a synchronization service configured to synchronize at least a portion of the computing environment on the computer with a copy of the computing environment hosted by a computing environment host;
exposes to the virtual environment interface a programmatic interface comprising:
at least one operation configured to write a data object to the computing environment, and
at least one operation configured to read a data application in the computing environment, and
at least one operation relating to at least one service; and
upon receiving application resource of an application that is not installed in the computing environment on the computer, installs the application in the computing environment on the computer using the application resource; and
a virtual environment interface comprising a browser plug-in that, when executed on the processor within the virtual environment, delivers the operation to the computing environment component on behalf of the application.

18. A method of apply an operation of an application executing within a virtual environment on a computer having a processor and a computing environment, the method comprising:
executing on the processor, outside of the virtual environment, a first instruction set configured to:
apply the operation to the computing environment; and
apply at least one service to the computing environment including a synchronization service configured to synchronize at least a portion of the computing environment on the computer with a copy of at least a portion of the computing environment; and
executing on the processor, within the virtual environment, a second instruction set configured to deliver the operation to a computing environment component on behalf of the application.

19. The method of claim 18:
the virtual environment comprising a browser, and
the second instruction set comprising a browser plug-in configured to interface with the first instruction set.

20. The method of claim 18:
the operation specifying a retrieving of at least one data object from the computing environment to be used by the application;
the first instruction set configured to:
retrieve the at least one data object from the computing environment, and
deliver the at least one data object to the virtual environment interface; and
the second instruction set configured to:
receive the at least one data object from the computing environment component, and
deliver the at least one data object to the application.

* * * * *